United States Patent
Cho et al.

(10) Patent No.: US 10,629,379 B2
(45) Date of Patent: Apr. 21, 2020

(54) CAPACITOR COMPONENT HAVING EXTERNAL ELECTRODES WITH REDUCED THICKNESS

(71) Applicant: SAMSUNG ELECTRO-MECHANICS CO., LTD., Suwon-si, Gyeonggi-do (KR)

(72) Inventors: Sung Hyun Cho, Suwon-si (KR); Byeong Chan Kwon, Suwon-si (KR); Yong Jin Yun, Suwon-si (KR); Ki Pyo Hong, Suwon-si (KR); Jae Yeol Choi, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 62 days.

(21) Appl. No.: 15/696,959

(22) Filed: Sep. 6, 2017

(65) Prior Publication Data
US 2018/0190433 A1    Jul. 5, 2018

(30) Foreign Application Priority Data

Jan. 2, 2017   (KR) .................. 10-2017-0000438

(51) Int. Cl.
*H01G 4/232*   (2006.01)
*H01G 4/30*   (2006.01)
(Continued)

(52) U.S. Cl.
CPC ........... *H01G 4/2325* (2013.01); *H01G 4/012* (2013.01); *H01G 4/12* (2013.01); *H01G 4/30* (2013.01); *H01G 13/006* (2013.01)

(58) Field of Classification Search
CPC ...... H01G 4/248; H01G 4/2325; H01G 4/232; H01G 4/30; H01G 4/12
See application file for complete search history.

(56) References Cited

U.S. PATENT DOCUMENTS

| | | | |
|---|---|---|---|
| 4,982,485 A * | 1/1991 | Nakaya | H01G 4/2325 29/25.42 |
| 6,124,769 A * | 9/2000 | Igarashi | H01C 1/142 333/172 |

(Continued)

FOREIGN PATENT DOCUMENTS

| CN | 104299784 A | 1/2015 |
|---|---|---|
| CN | 104779052 A | 7/2015 |

(Continued)

OTHER PUBLICATIONS

Office Action issued in corresponding Korean Patent Application No. 10-2017-0000438, dated Jun. 28, 2018.
(Continued)

*Primary Examiner* — David M Sinclair
(74) *Attorney, Agent, or Firm* — Morgan, Lewis & Bockius LLP

(57) ABSTRACT

A capacitor component includes a body having a first surface and a second surface opposing each other and including a multilayer structure in which a plurality of dielectric layers are stacked and first and second internal electrodes are alternately disposed with respective dielectric layers interposed therebetween and exposed to the first surface and the second surface, respectively, first and second metal layers covering the first surface and the second surface and connected to the first and second internal electrodes, respectively, first and second ceramic layers covering the first and second metal layers, and first and second external electrodes covering the first and second ceramic layers and connected to the first and second metal layers to be electrically connected to the first and second internal electrodes, respectively.

14 Claims, 8 Drawing Sheets

(51) Int. Cl.
*H01G 4/12* (2006.01)
*H01G 13/00* (2013.01)
*H01G 4/012* (2006.01)

(56) References Cited

U.S. PATENT DOCUMENTS

| | | | |
|---|---|---|---|
| 9,373,446 | B2 | 6/2016 | Park et al. |
| 9,439,301 | B2 | 9/2016 | Jeon et al. |
| 2007/0205514 | A1* | 9/2007 | Togashi ............... H01G 4/2325 257/758 |
| 2009/0190285 | A1* | 7/2009 | Kusano ................. H01G 4/232 361/321.4 |
| 2009/0211687 | A1* | 8/2009 | Iguchi .................... H01G 4/30 156/60 |
| 2014/0029157 | A1* | 1/2014 | Kwag ..................... H01G 4/30 361/301.4 |
| 2015/0022942 | A1 | 1/2015 | Chae et al. |
| 2015/0124370 | A1* | 5/2015 | Ahn ....................... H01G 4/224 361/272 |
| 2015/0200054 | A1 | 7/2015 | Lee et al. |
| 2016/0071647 | A1 | 3/2016 | Nishisaka et al. |
| 2017/0278634 | A1* | 9/2017 | Kato .................... H01G 4/0085 |
| 2017/0278635 | A1* | 9/2017 | Mizuno ................ H01G 4/005 |

FOREIGN PATENT DOCUMENTS

| | | | |
|---|---|---|---|
| CN | 104979096 A | | 10/2015 |
| JP | 10135073 A | * | 5/1998 |
| JP | 11-054358 A | | 2/1999 |
| JP | 2001223132 A | * | 8/2001 |
| JP | 2008-130770 A | | 6/2008 |
| JP | 2009088319 A | * | 4/2009 |
| JP | 2015-039016 A | | 2/2015 |
| JP | 2015-043424 A | | 3/2015 |
| KR | 10-1228752 B1 | | 1/2013 |
| KR | 10-2016-0030372 A | | 3/2016 |

OTHER PUBLICATIONS

Office Action issued in corresponding Korean Patent Application No. 10-2017-0000438, dated Dec. 15, 2017, with English Translation.

Office Action issued in corresponding Chinese Application No. 201711129033.6, dated Jul. 3, 2019.

Office Action issued in corresponding U.S. Appl. No. 16/717,745 dated Feb. 12, 2020.

* cited by examiner

CAPACITOR COMPONENT HAVING EXTERNAL ELECTRODES WITH REDUCED THICKNESS

CROSS-REFERENCE TO RELATED APPLICATION(S)

This application claims benefit of priority to Korean Patent Application No. 10-2017-0000438 filed on Jan. 2, 2017 in the Korean Intellectual Property Office, the disclosure of which is incorporated herein by reference in its entirety.

TECHNICAL FIELD

The present disclosure relates to a capacitor component and a method of manufacturing the same.

BACKGROUND

A multilayer ceramic capacitor, a capacitor component, is a chip-type condenser mounted on printed circuit boards of several electronic products such as an imaging apparatus, for example, a liquid crystal display (LCD), a plasma display panel (PDP), or the like, a computer, a smartphone, a cellular phone, and the like, to serve to charge electricity therein or discharge electricity therefrom.

The multilayer ceramic capacitor (MLCC) may be used as a component of various electronic apparatuses since it is relatively small, implements high capacitance, and is easily mounted. Recently, a multilayer ceramic capacitor used in a mobile device, an automobile, or the like, is required to have a high degree of mechanical strength. For example, a multilayer ceramic capacitor used in a mobile device, an automobile, or the like, should be able to endure environments in which repeated external vibrations, impacts, harsh temperatures, humidity, and the like may be encountered.

In the MLCC used in the related art, external electrodes are obtained by applying and then sintering a paste. In the external electrodes obtained as described above, thicknesses of outer regions of the external electrodes are relatively lower than those of central regions of the external electrodes. In a case in which the thicknesses of the external electrodes are non-uniform as described above, a decrease in amounting density of the MLCC, deterioration of sealing characteristics of the external electrodes, a plating defect due to a blister, or the like, may be caused.

SUMMARY

An aspect of the present disclosure may provide a capacitor component in which thicknesses of external electrodes may be reduced and sealing characteristics and moisture resistance reliability of the external electrodes may be improved. An aspect of the present disclosure may also provide a method of manufacturing a capacitor component capable of efficiently manufacturing the capacitor component.

According to an aspect of the present disclosure, a capacitor component may include a body having a first surface and a second surface opposing each other and including a multilayer structure in which a plurality of dielectric layers are stacked and first and second internal electrodes are alternately disposed with respective dielectric layers interposed therebetween and exposed to the first surface and the second surface, respectively, first and second metal layers covering the first surface and the second surface and connected to the first and second internal electrodes, respectively, first and second ceramic layers covering the first and second metal layers, respectively, and first and second external electrodes covering the first and second ceramic layers and connected to the first and second metal layers to be electrically connected to the first and second internal electrodes, respectively.

The first and second metal layers may cover the entire first surface and the entire second surface of the body, respectively.

Each of the first and second metal layers may have a uniform thickness.

The first ceramic layer may cover the entire first metal layer, and the second ceramic layer may cover the entire second metal layer.

Areas of the first metal layer and the first ceramic layer, in relation to the first surface of the body, may be the same as each other, and areas of the second metal layer and the second ceramic layer, in relation to the second surface of the body, may be the same as each other.

The first and second external electrodes may have multilayer structures, respectively.

Each of the first and second external electrodes may include a first layer that is a sintered electrode and a second layer, which is a plating electrode, covering the first layer.

The capacitor component may further include a third metal layer disposed between the first ceramic layer and the first external electrode, and a fourth metal layer disposed between the second ceramic layer and the second external electrode.

The first and second metal layers and the third and fourth metal layers may be formed of the same material.

Areas of the first and third metal layers and the first ceramic layer, in relation to the first surface of the body, may be the same as one another, and areas of the second and fourth metal layers and the second ceramic layer, in relation to the second surface of the body, may be the same as one another.

The first and second metal layers may include a Ni component.

The first and second ceramic layer may be formed of the same material as that of the plurality of dielectric layers.

A weight ratio of organic material components in the first and second ceramic layers to the remaining material components in the first and second ceramic layer, may be greater than a weight ratio of organic material components in the plurality of dielectric layers to the remaining material components in the plurality of dielectric layers.

The first and second external electrodes may extend to cover, respectively, third and fourth surfaces of the body opposing each other while connecting the first and second surfaces to each other.

Portions of the first and second external electrodes covering the third surface and the fourth surface, respectively, may be physically connected to the metal layers.

According to another aspect of the present disclosure, a method of manufacturing a capacitor component may include: forming a body by alternately stacking a plurality of dielectric layers and first and second internal electrodes, forming first and second metal layers on surfaces of the body on which the first and second internal electrodes are exposed, respectively, forming first and second ceramic layers to cover the first and second metal layers, respectively, and forming first and second external electrodes to be connected to the first and second metal layers while covering the first and second ceramic layers, respectively.

The forming of the first and second metal layers may include transferring the first and second metal layers to the body.

The forming of the first and second ceramic layers may include transferring the first and second ceramic layers to the first and second metal layers, respectively.

The forming of the first and second metal layers and the first and second ceramic layers may include transferring a laminate of the first metal layer and the first ceramic layer to the body simultaneously, and transferring a laminate of the second metal layer and the second ceramic layer to the body simultaneously.

The method may further include simultaneously firing the body, the first and second metal layers, and the first and second ceramic layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
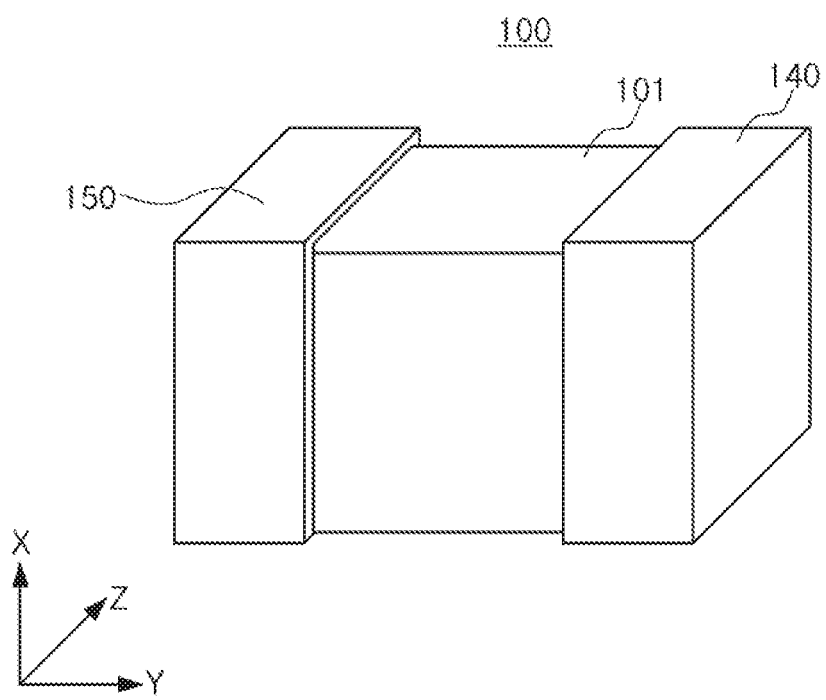
FIG. 1 is a schematic perspective view illustrating a capacitor component according to an exemplary embodiment in the present disclosure.
Figure 2:
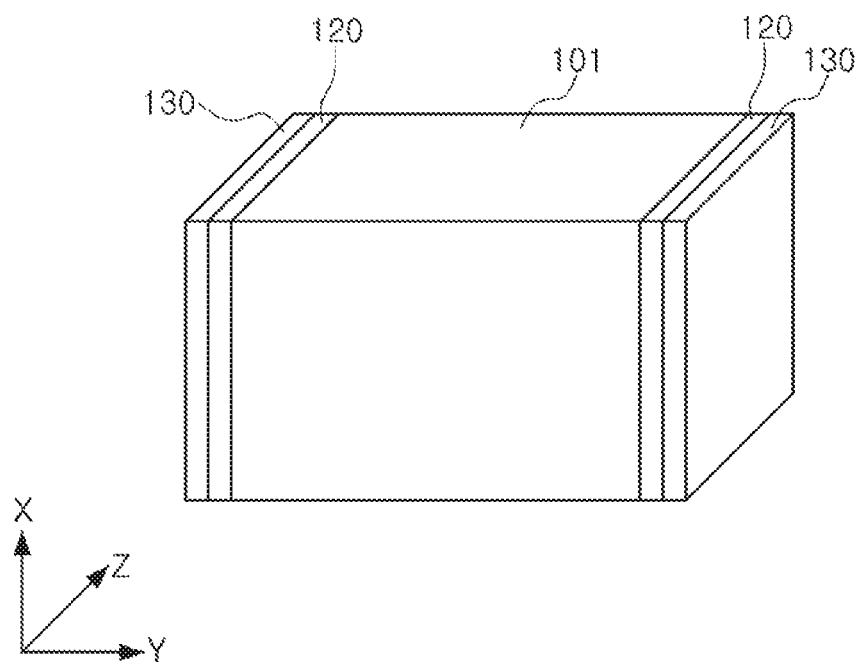
FIG. 2 is a schematic perspective view illustrating forms of a body, a metal layer, and a ceramic layer in the capacitor component of FIG. 1.

FIG. 1 is a schematic perspective view illustrating a capacitor component according to an exemplary embodiment in the present disclosure. FIG. 2 is a schematic perspective view illustrating forms of a body, a metal layer, and a ceramic layer in the capacitor component of FIG. 1. In addition, FIG. 3 is a cross-sectional view illustrating the capacitor component of FIG. 1.

Figure 3:
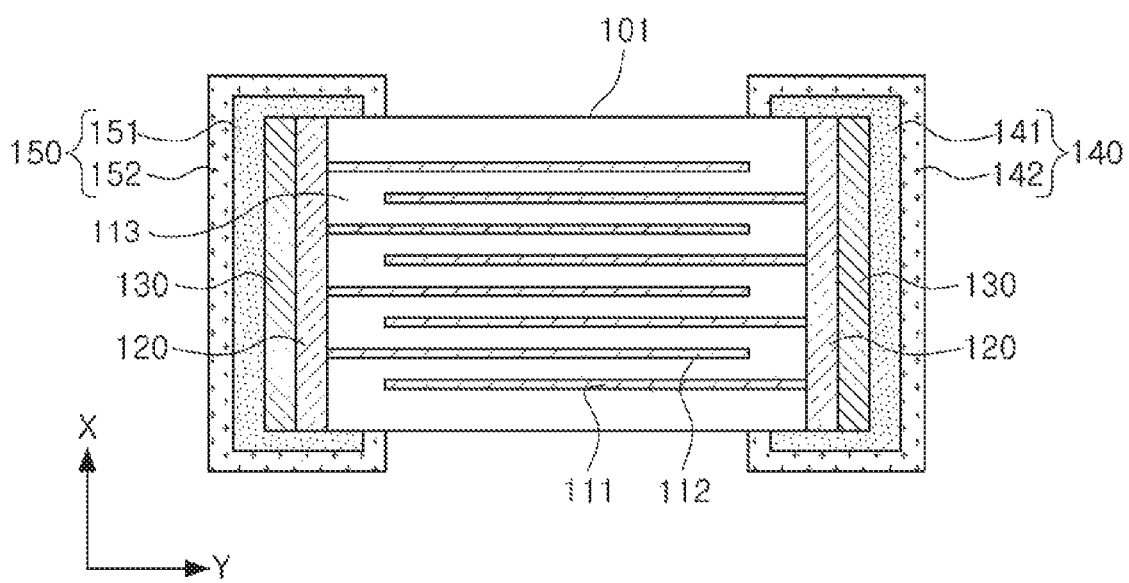
FIG. 3 is a cross-sectional view illustrating the capacitor component of FIG. 1.

Referring to FIGS. 1 through 3, the capacitor component 100 according to the exemplary embodiment in the present disclosure may include a body 101, first and second internal electrodes 111 and 112 included in the body 101, metal layers 120, ceramic layers 130, and first and second external electrodes 140 and 150 as main components. In the present exemplary embodiment, as described below, a multilayer structure of the metal layers 120 and the ceramic layers 130 covering end surfaces of the body 101 may be used, which is advantageous in miniaturization of the capacitor component 100. In addition, sealing characteristics, moisture resistance reliability, and the like, may be improved due to the multilayer structure.

The body 101 may include a multilayer structure in which a plurality of dielectric layers 113 are stacked, and the first and second internal electrodes 111 and 112 alternately disposed with respective dielectric layers 113 interposed therebetween. In this case, as in a form illustrated in FIG. 2, the body 101 may have a hexahedral shape or a shape similar to a hexahedral shape, and include a first surface and a second surface opposing each other. In this case, the first surface and the second surface may correspond to left and right end surfaces of the body 101 in FIG. 3.

The dielectric layers 113 included in the body 101 may include a dielectric material such as a ceramic material, or the like, known in the related art, for example, a barium titanate ($BaTiO_3$)-based ceramic powder, or the like. In this case, an example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially dissolved in $BaTiO_3$. However, an example of the barium titanate ($BaTiO_3$) based ceramic powder is not limited thereto.

The body 101 may be divided into an active region forming capacitance, and cover regions positioned on upper and lower surfaces of the active region. In detail, in FIG. 1, the active region may form the capacitance by the first and second internal electrodes 111 and 112, and the cover regions may be disposed on the upper and lower surfaces of the active region. In this case, the cover regions may serve to prevent damage to the first and second internal electrodes 111 and 112 due to physical or chemical stress, and may be formed of the same material as that of the dielectric layers 113 of the active region and have the same configuration as that of the dielectric layers 113 of the active region except that they do not include the internal electrodes 111 and 112. In this case, the cover regions may be obtained together by stacking and then sintering green sheets. The cover regions may be implemented in a form in which one or two or more green sheets are stacked on the upper and lower surfaces of the active region and are then sintered.

The first and second internal electrodes 111 and 112 may be alternately disposed to face each other with respective dielectric layers 113 configuring the body interposed therebetween, and may be exposed to both end portions of the body 101, respectively. Here, the first and second internal electrodes 111 and 112 may be electrically separated from each other by respective dielectric layers 113 disposed therebetween. A material forming each of the first and second internal electrodes 111 and 112 is not particularly limited, but may be a conductive paste formed of one or more of, for example, a noble metal material such as palladium (Pd), a palladium-silver (Pd—Ag) alloy, or the like, nickel (Ni), and copper (Cu). A method of printing the conductive paste may be a screen printing method, a gravure printing method, or the like, but is not limited thereto. In addition, thicknesses of the first and second internal electrodes 111 and 112 may be appropriately determined depending on the purpose, or the like, and may be, for example, 0.1 to 5 μm or 0.1 to 2.55 μm, but are not particularly limited thereto.

The metal layers 120 may cover the first surface and the second surface of the body 101, and may be in contact with the first and second internal electrodes 111 and 112. In this case, the metal layers 120 may cover the entirety of the first surface and the second surface of the body 101 as in a form illustrated in FIG. 2, and a surface of the metal layer 120 toward the body 101 may have the same area as that of the first surface of the body 101. In addition, the metal layers 120 may have uniform thicknesses in relation to the first surface and the second surface of the body 101. As an example that may obtain the metal layers 120 having such a form, a process of transferring the metal layers 120 to surfaces of the body 101 may be utilized.

In the related art, a process of applying and then sintering a conductive paste was used at the time of forming external electrodes connected to the internal electrodes 111 and 112. Therefore, non-uniformity of thicknesses between central regions and outer regions of the external electrodes occurred (thicknesses of the central regions were greater than those of the outer regions). In the present exemplary embodiment, the metal layers 120 having the uniform thicknesses are used, such that electrical characteristics may be uniform and moisture resistance reliability for moisture permeated from the outside of the capacitor component 100 into the capacitor component 100 particularly at edge regions may be improved.

Meanwhile, the metal layer 120 may be formed of an appropriate metal among metals having high electrical conductivity, and may include, for example, a Ni component. In the present exemplary embodiment, the metal layers 120 may be provided in a form of a sintered electrode, and may be sintered simultaneously with the body 101. In this case, the metal layer 120, before being sintered, may be transferred to the body 101 in a state in which it includes metal particles, and an organic material such as a binder, and the organic material, or the like, may be removed after the metal layer 120 is sintered.

The ceramic layers 130 may cover the metal layers 120, and may be formed of a ceramic material such as barium titanate, or the like. In this case, the ceramic layers 130 may include the same ceramic material as the ceramic material included in the body 101, and may be formed of the same material as that of the plurality of dielectric layers 113. As in a form illustrated in FIG. 2, the ceramic layers 130 may cover the entirety of the metal layers 120. In this case, areas of the metal layers 120 and the ceramic layers 130 in relation to the first surface and the second surface of the body 101 may be the same as each other. The ceramic layers 130 may be formed in a manner of transferring the ceramic layers 130 on the surfaces of the body 101 like the metal layers 120, and may later be subjected to a sintering process. The ceramic layers 130, before being sintered, need to have high adhesion for the purpose of a transfer process. To this end, the ceramic layers 130 before being sintered may include a relatively large weight ratio of an organic material such as a binder, or the like to the remaining materials to form the ceramic layers 130. In this case, since some of the organic material may remain even after the ceramic layers 130 are sintered, the ceramic layers 130 may include a weight ratio of organic material component to the remaining material component of the ceramic layers 130 larger than a weight ratio of organic material component in the plurality of dielectric layers 113 to the remaining material component in the plurality of dielectric layers 113.

As in the present exemplary embodiment, the ceramic layers 130 may be formed on outer surfaces of the body 101 to further improve sealing characteristics of the external electrodes, resulting in a significant reduction in permeation of moisture, a plating solution, or the like, from the outside into the body 101. In this case, the ceramic layers 130 may be rapidly densified at the time of being sintered due to the metal layers 120 adjacent to the ceramic layers 130, and a structure appropriate for improving moisture resistance characteristics may thus be effectively obtained.

The first and second external electrodes 140 and 150 may be formed on the outer surfaces of the body 101, and may be electrically connected to the first and second internal electrodes 111 and 112, respectively. In detail, the first and second external electrodes 140 and 150 may cover the ceramic layers 130, and may be in contact with the metal layers 120 to thus be electrically connected to the first and second internal electrodes 111 and 112, respectively.

The first and second external electrodes 140 and 150 may have multilayer structures, respectively. For example, the first and second external electrodes 140 and 150 may include first layers 141 and 151 and second layers 142 and 152, respectively. Here, the first layers 141 and 151 may be formed of sintered electrodes obtained by sintering a conductive paste, and the second layers 142 and 152 may cover the first layers, and may include one or more plating layers. In addition, the first and second external electrodes 140 and 150 may include other additional layers, in addition to the first layers 141 and 151 and the second layers 142 and 152. For example, the first and second external electrodes 140 and 150 may include conductive resin electrodes disposed between the first layers 141 and 151 and the second layers 142 and 152 to alleviate mechanical impacts, or the like.

In addition, as in a form illustrated in FIG. 3, the first and second external electrodes 140 and 150 may extend to cover, respectively, third and fourth surfaces of the body 101 opposing each other while connecting the first and second surfaces of the body 101 to each other. Here, the third surface and the fourth surface may correspond, respectively, to an upper surface and a lower surface of the body 101 in FIG. 3. Regions of the first and second external electrodes 140 and 150 covering the third surface and the fourth surface of the body 101, respectively, may be physically connected to the metal layers 120.

Figure 4:
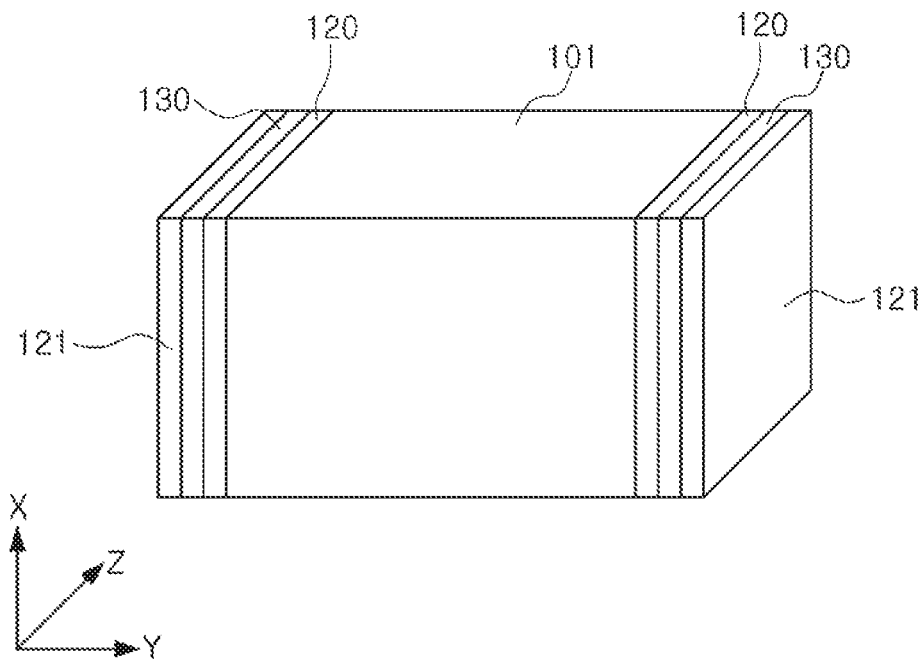
FIGS. 4 and 5 are, respectively, a perspective view illustrating a form of a body of a capacitor component according to a modified example and a cross-sectional view of the capacitor component.
Figure 5:
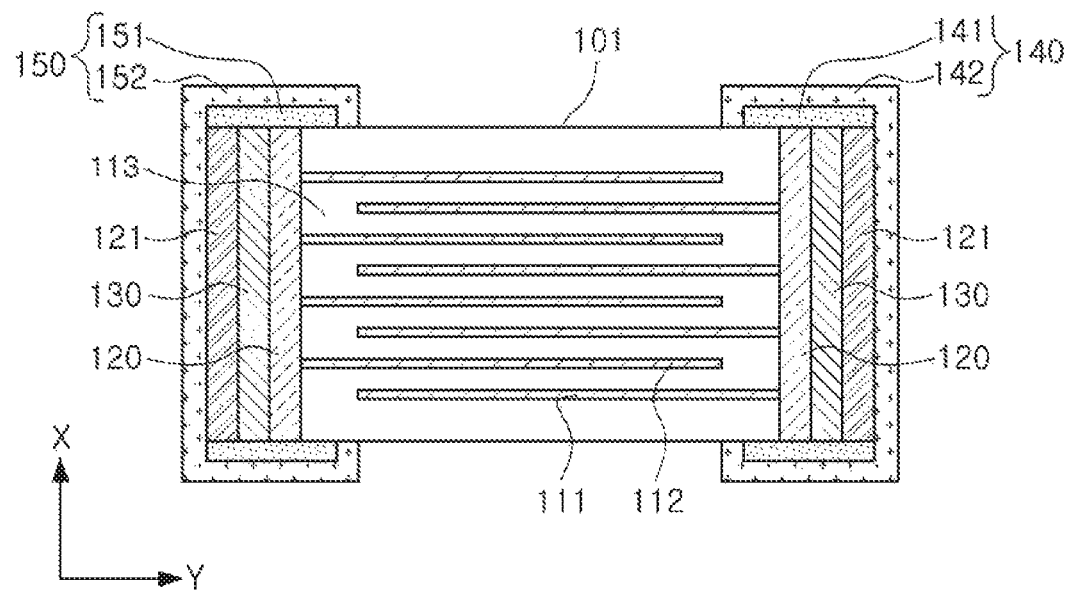

FIGS. 4 and 5 are, respectively, a perspective view illustrating a form of a body of a capacitor component according to a modified example and a cross-sectional view of the capacitor component.

Referring to FIGS. 4 and 5, the capacitor component according to the modified example may further include additional metal layers 121. The additional metal layers 121 may cover the ceramic layers 130. That is, the additional metal layers 121 may be disposed between the ceramic layers 130 and the first and second external electrodes 140 and 150, respectively, to further improve moisture resistance reliability. The additional metal layer 121 may be formed of the same material as that of the metal layer 120, and may include, for example, a Ni component. In addition, as in a form illustrated in FIG. 4, areas of the metal layers 120, the ceramic layers 130, and the additional metal layers 121 in relation to the first surface and the second surface of the body 101 may be the same as one another.

In a case in which the additional metal layers 121 are formed, the first layers 141 and 151 of the first and second external electrodes 140 and 150 may only be formed on the upper surface and the lower surface (the third surface and the fourth surface) of the body 101, as in a form illustrated in FIG. 5.

An example of a method of manufacturing the capacitor component having the structure described above will be described with reference to FIGS. 6 to 10. The structure of the capacitor component may be more clearly understood through a description for the method of manufacturing the capacitor component.

Figure 6:
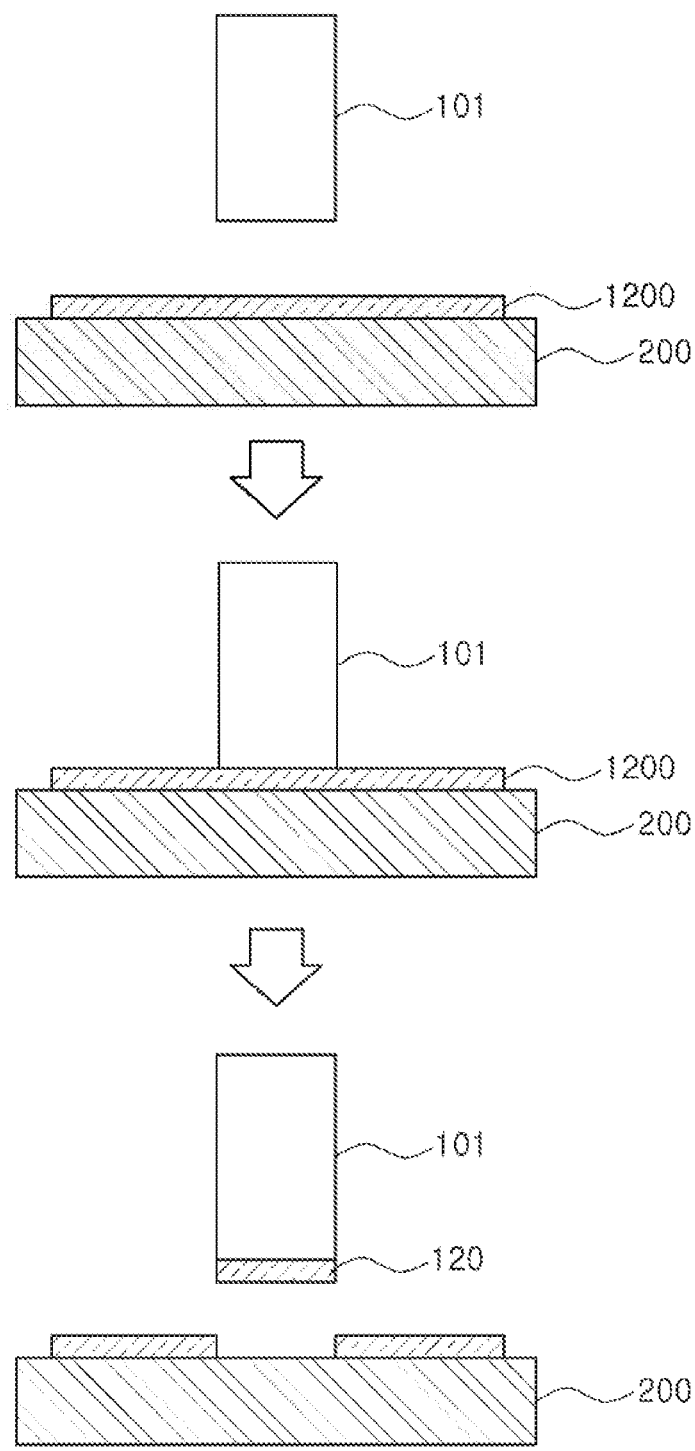
FIGS. 6 through 10 are views illustrating an example of a method of manufacturing a capacitor component according to an exemplary embodiment in the present disclosure.

In a process of manufacturing the capacitor component, the metal layer 120 may first be transferred to the surface of the body 101, as in a form illustrated in FIG. 6. Here, the body 101 may be formed by alternately stacking the plurality of dielectric layers and the first and second internal electrodes. For example, a manner of applying a conductive paste for forming an internal electrode to ceramic green sheets and stacking the ceramic green sheets to which the conductive paste is applied may be used. The metal layers 120 may be formed on the surfaces of the body 101 on which the first and second internal electrodes are exposed. In a process of transferring the metal layers 120, a metal layer 1200 having a sheet form may be prepared on a supporting stand 200, and the body 101 may be compressed to the metal layer 1200, such that a portion of the metal layer 1200 may be attached to the surface of the body 101 and become the metal layer 120. The metal layer 120 transferred to the body 101 may be in a state before it is sintered, and may include components such as a binder, an organic solvent, and the like.

Figure 7:
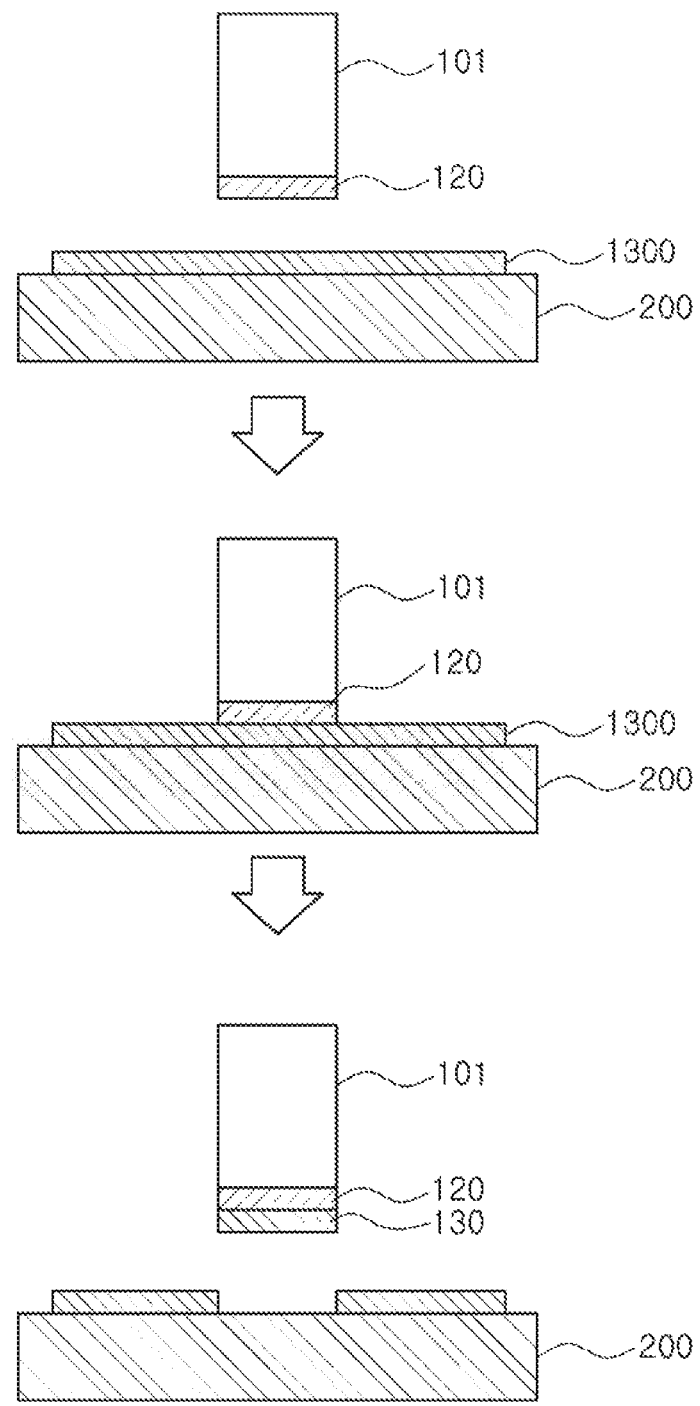
Figure 8:
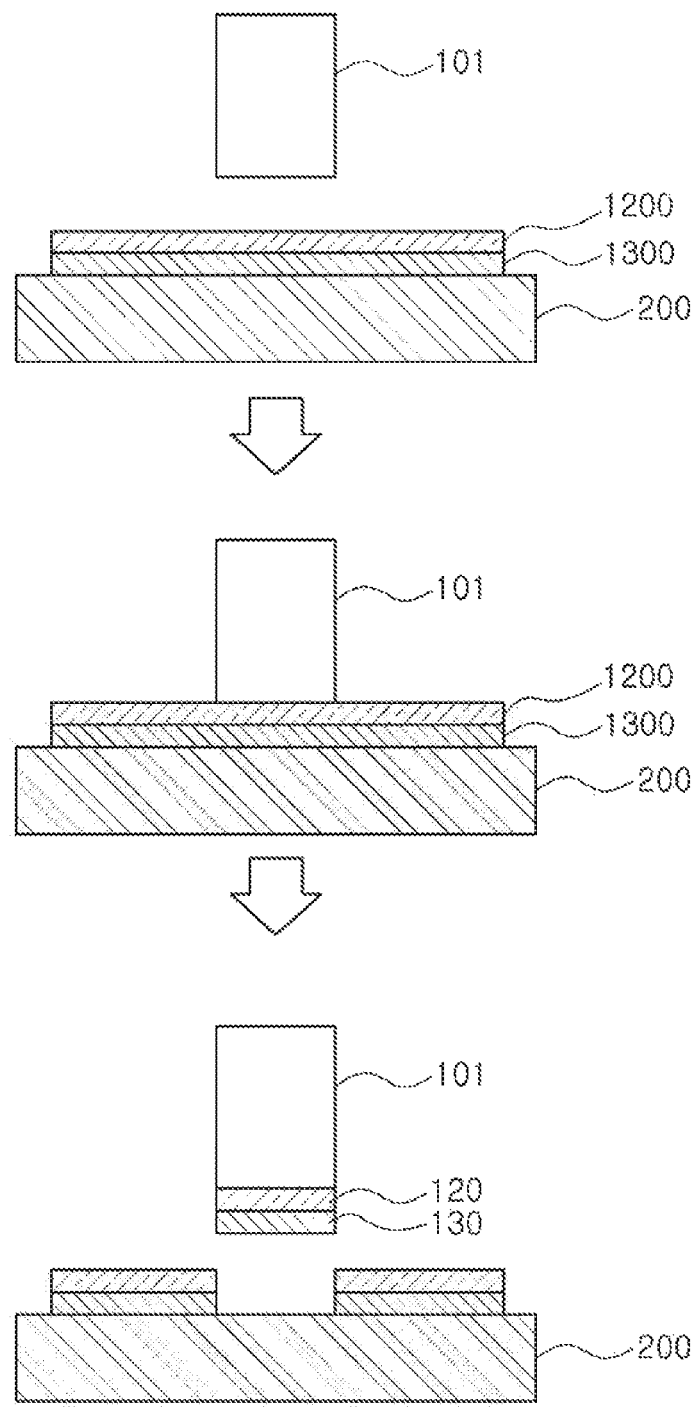

After the metal layer 120 is formed, the ceramic layer 130 covering the metal layer 120 may be formed as in a form illustrated in FIG. 7, and a transfer process may be used, like that of the metal layer 120. That is, a ceramic layer 1300, before being sintered, may be disposed on the supporting stand 200, and the body 101 may be compressed to the ceramic layer 1300, such that a portion of the ceramic layer 1300 may be attached to a surface of the metal layer 120 and become the ceramic layer 130. The ceramic layer 130, transferred to the body 101, may be in a state before being sintered, and may include components such as a binder, an organic solvent, and the like.

Meanwhile, processes of individually transferring the metal layer 120 and the ceramic layer 130 are used in the present exemplary embodiment, but only one transfer process may also be used. That is, as in a form illustrated in FIG. 8, after a metal layer 1200 and a ceramic layer 1300 are stacked on the supporting stand 200, a multilayer structure of the metal layer 120 and the ceramic layer 130 may be obtained on the body 101 by one transfer process.

Figure 9:
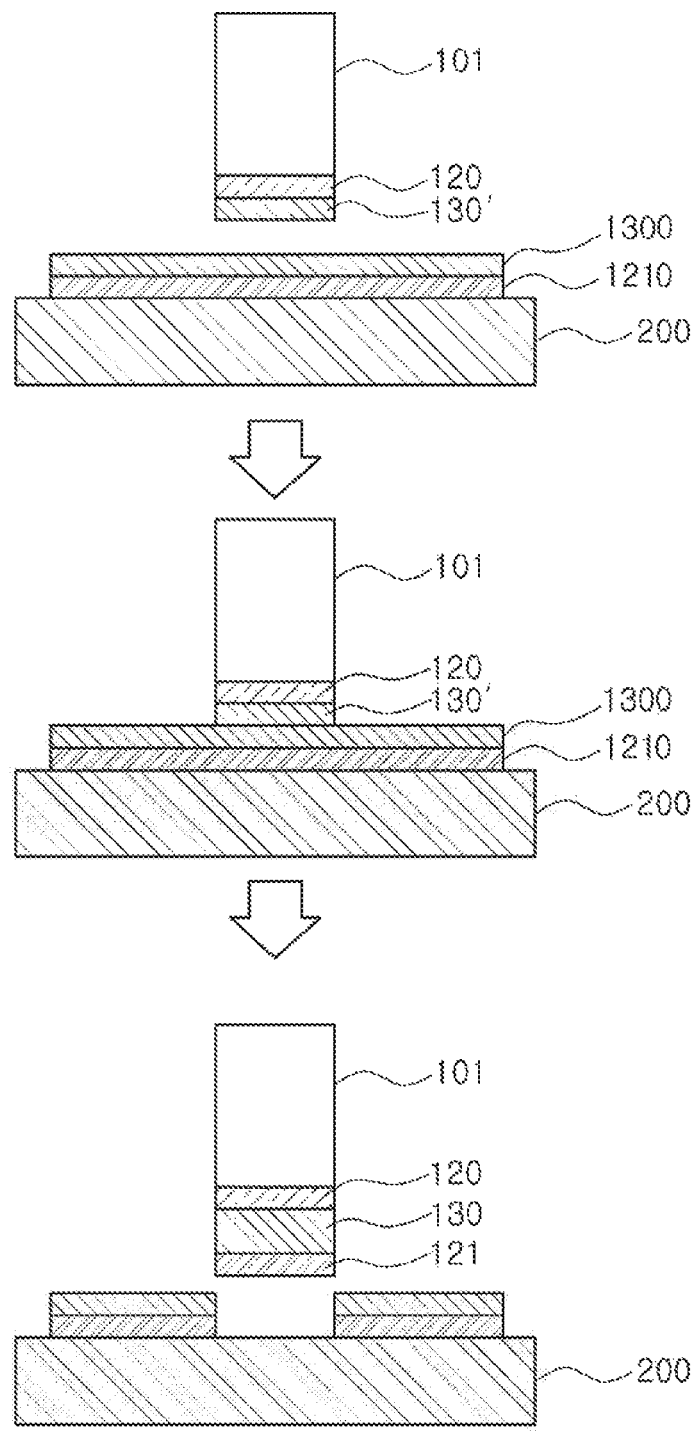

In addition, FIG. 9 illustrates an example of a process of forming the additional metal layer 121. An additional transfer process may be applied in a state in which the metal layer 120 and a portion 130' of the ceramic layer 130 are formed on the body 101. In this case, a ceramic layer 1300 and a metal layer 1210 may be stacked on the supporting stand 200 in a changed sequence. In this state, in a case in which a multilayer structure of another portion of the ceramic layer 130 and the metal layer 121 is transferred to the body 101, a multilayer structure may be obtained in a sequence of the metal layer 120, the ceramic layer 130, and the additional metal layer 121 from the surface of the body 101.

An example of a method of forming the metal layer 120, the ceramic layer 130, and the additional metal layer 121 on the body 101 has been described hereinabove, and the same process may be applied to the other surface of the body 101.

Figure 10:
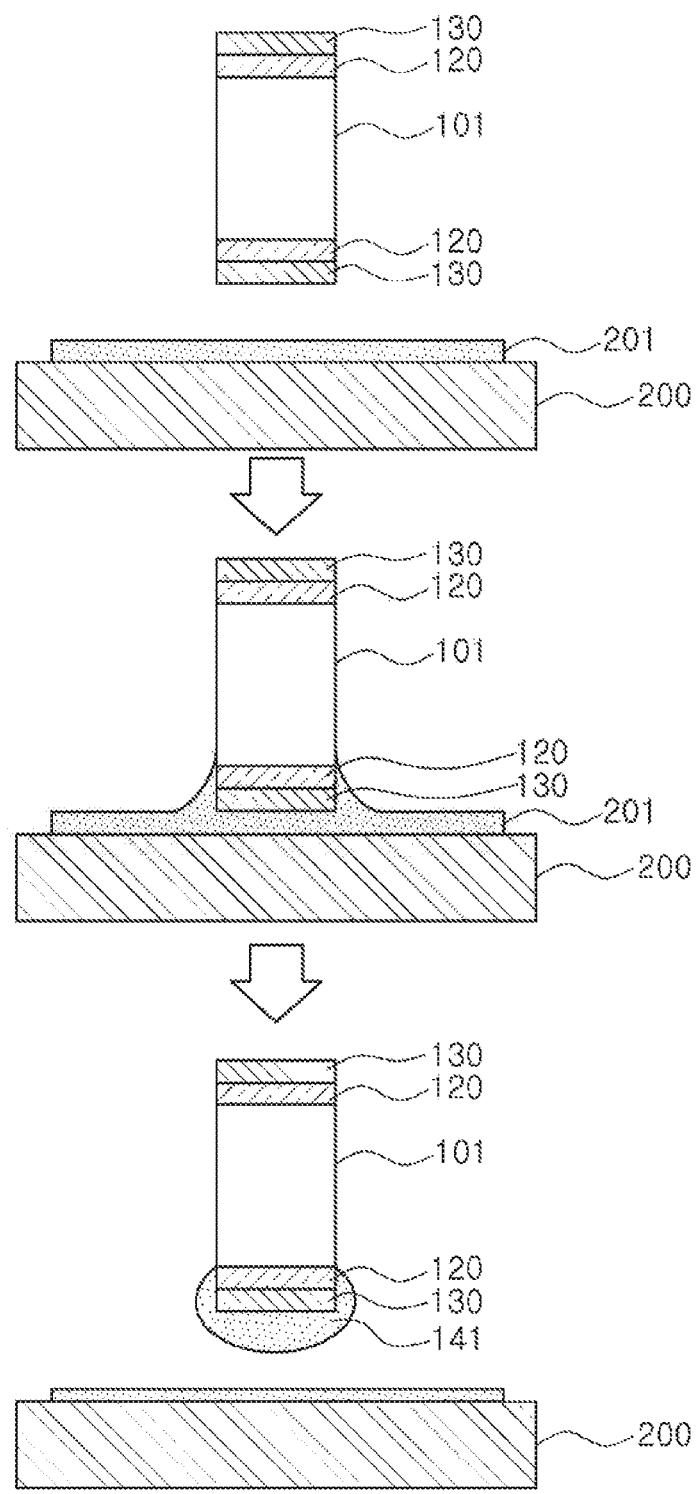

Then, the external electrode connected to the metal layer 120 while covering the ceramic layer 130 may be formed, and FIG. 10 illustrates a process of forming the first layer 141 of the external electrode. As described above, the first layer 141 may be obtained by dipping the body 101 in a conductive paste 201. Then, the body 101, the metal layer 120, the ceramic layer 130, and the first layer 141 may be fired. Here, the body 101, the metal layer 120, the ceramic layer 130, and the first layer 141 may be simultaneously fired.

As set forth above, according to the exemplary embodiments in the present disclosure, the capacitor component in which the thicknesses of the external electrodes may be reduced and the sealing characteristics and the moisture resistance reliability of the external electrodes may be improved may be obtained. In addition, the method of manufacturing a capacitor component capable of efficiently manufacturing the capacitor component may be obtained.

While exemplary embodiments have been shown and described above, it will be apparent to those skilled in the art that modifications and variations could be made without departing from the scope of the present invention as defined by the appended claims.

What is claimed is:

1. A capacitor component comprising:
a body having a first surface and a second surface opposing each other and third and fourth surfaces opposing each other in a stacking direction while respectively connecting the first and second surfaces to each other, and including a multilayer structure in which a plurality of dielectric layers are stacked in the stacking direction and first and second internal electrodes are alternately disposed with respective dielectric layers interposed therebetween and exposed to the first surface and the second surface, respectively;
first and second metal layers covering the first surface and the second surface and connected to the first and second internal electrodes, respectively;
first and second ceramic layers covering the first and second metal layers, respectively; and
first and second external electrodes disposed on the first and second surfaces, and covering the first and second ceramic layers, and connected to the first and second metal layers to be connected to the first and second internal electrodes, respectively,
wherein the first metal layer is disposed only on the first surface among the first, third and fourth surfaces,
the second metal layer is disposed only on the second surface among the second, third and fourth surfaces,
the first and second external electrodes extend to cover the third and fourth surfaces of the body, respectively, and
the first and second metal layers cover the entire first surface and the entire second surface of the body, respectively.

2. The capacitor component of claim 1, wherein each of the first and second metal layers has a uniform thickness.

3. The capacitor component of claim 1, wherein the first and second ceramic layers cover the entire first metal layer and the entire second metal layer, respectively.

4. The capacitor component of claim 1, wherein the first and second external electrodes have multilayer structures, respectively.

5. The capacitor component of claim 4, wherein each of the first and second external electrodes includes a first layer that is a sintered electrode and a second layer covering the first layers.

6. The capacitor component of claim 1, further comprising a third metal layer disposed between the first ceramic layer and the first external electrode, and a fourth metal layer disposed between the second ceramic layer and the second external electrode.

7. The capacitor component of claim 6, wherein the first and second metal layers and the third and fourth metal layers are formed of the same material.

8. The capacitor component of claim 6, wherein areas of the first and third metal layers and the first ceramic layer, in relation to the first surface of the body, are the same as one another, and areas of the second and fourth metal layers and the second ceramic layer, in relation to the second surface of the body, are the same as one another.

9. The capacitor component of claim 1, wherein the first and second metal layers include a Ni component.

10. The capacitor component of claim 1,
wherein a weight ratio of organic material components in the first and second ceramic layers to the remaining material components in the first and second ceramic layer is greater than a weight ratio of organic material components in the plurality of dielectric layers to the remaining material components in the plurality of dielectric layers.

11. The capacitor component of claim 1, wherein extending portions of the first external electrode to cover the third surface and the fourth surface, respectively, are in contact with ends of the first metal layer and ends of the first ceramic layer, and
   extending portions of the second external electrode to cover the third surface and the fourth surface, respectively, are in contact with ends of the second metal layer and ends of the second ceramic layer.

12. The capacitor component of claim 1,
   wherein the first ceramic layer covers only the first metal layer, and the second ceramic layer covers only the second metal layer;
   the first external electrode is in contact with opposing ends of the first metal layer and opposing ends of the first ceramic layer, and
   the second external electrode is in contact with opposing ends of the first metal layer and opposing ends of the first ceramic layer.

13. A capacitor component comprising:
   a body having a first surface and a second surface opposing each other and third and fourth surfaces opposing each other in a stacking direction while respectively connecting the first and second surfaces to each other, and including a multilayer structure in which a plurality of dielectric layers are stacked in the stacking direction and first and second internal electrodes are alternately disposed with respective dielectric layers interposed therebetween and exposed to the first surface and the second surface, respectively;
   first and second metal layers covering the first surface and the second surface and connected to the first and second internal electrodes, respectively;
   first and second ceramic layers covering the first and second metal layers, respectively; and
   first and second external electrodes disposed on the first and second surfaces, and covering the first and second ceramic layers, and connected to the first and second metal layers to be connected to the first and second internal electrodes, respectively,
   wherein the first metal layer is disposed only on the first surface among the first, third and fourth surfaces,
   the second metal layer is disposed only on the second surface among the second, third and fourth surfaces,
   the first and second external electrodes extend to cover the third and fourth surfaces of the body, respectively, and
   areas of the first metal layer and the first ceramic layer, in relation to the first surface of the body, are the same as each other, and areas of the second metal layer and the second ceramic layer, in relation to the second surface of the body, are the same as each other.

14. A capacitor component comprising:
   a body having a first surface and a second surface opposing each other and third and fourth surfaces opposing each other in a stacking direction while respectively connecting the first and second surfaces to each other, and including a multilayer structure in which a plurality of dielectric layers are stacked in the stacking direction and first and second internal electrodes are alternately disposed with respective dielectric layers interposed therebetween and exposed to the first surface and the second surface, respectively;
   first and second metal layers covering the first surface and the second surface and connected to the first and second internal electrodes, respectively;
   first and second ceramic layers covering the first and second metal layers, respectively; and
   first and second external electrodes disposed on the first and second surfaces, and covering the first and second ceramic layers, and connected to the first and second metal layers to be connected to the first and second internal electrodes, respectively,
   wherein the first metal layer is disposed only on the first surface among the first, third and fourth surfaces,
   the second metal layer is disposed only on the second surface among the second, third and fourth surfaces,
   the first and second external electrodes extend to cover the third and fourth surfaces of the body, respectively, and
   the first and second ceramic layers are formed of the same material as that of the plurality of dielectric layers.

* * * * *